United States Patent [19]

Rodenkirch

[11] Patent Number: 5,275,420
[45] Date of Patent: Jan. 4, 1994

[54] END SEALS FOR V-TYPE INTERNAL COMBUSTION ENGINES AND ENGINE SEALING METHOD

[75] Inventor: Norman E. Rodenkirch, Chelsea, Mich.

[73] Assignee: Chrysler Corporation, Highland Park, Mich.

[21] Appl. No.: 991,667

[22] Filed: Dec. 16, 1992

[51] Int. Cl.$^5$ ............................................. F16J 15/14
[52] U.S. Cl. .................................... 277/1; 277/235 B
[58] Field of Search ............... 277/1, 9, 72, FM, 9, 72, FM, 17, 171, 235 B, DIG 6

[56] References Cited

U.S. PATENT DOCUMENTS

| | | | |
|---|---|---|---|
| 3,355,181 | 11/1967 | Olson | 277/180 |
| 4,630,835 | 12/1986 | Locacius | 277/235 B |
| 4,819,953 | 4/1989 | Joh | 277/235 B |
| 4,832,349 | 5/1989 | Kawai et al. | 277/1 X |
| 4,846,482 | 7/1989 | Blodgett et al. | 277/235 B |
| 4,930,792 | 6/1990 | Glück et al. | 277/235 B |

FOREIGN PATENT DOCUMENTS

| | | | |
|---|---|---|---|
| 182391 | 5/1986 | European Pat. Off. | 277/1 |
| 9110851 | 7/1991 | PCT Int'l Appl. | 277/1 |

Primary Examiner—William A. Cuchlinski, Jr.
Assistant Examiner—Scott W. Cummings
Attorney, Agent, or Firm—Kenneth H. MacLean

[57] ABSTRACT

End seals having a large compressibility range are mounted by their adhesive underlayer to support surfaces of an engine block and are formed with transverse notches in opposite ends to receive a given quantity of silicone or other suitable sealant. The end seals mate with intake manifold gaskets which may have notches therein that align with the notches of the end seals for receiving the sealant. The end seal, the head and intake manifold gaskets terminate at junctures of the engine block, cylinder heads and manifold which define recesses therebetween providing potential oil leak paths. These paths are effectively sealed as the manifold is connected to the cylinder head and block assembly causing the end seals to be compressed and the sealant to be squeezed into the recesses so that the gaskets and the end seal are joined in an oil sealing manner. With this construction, the sealants are confined in the covered recess providing not only repeatable high quality seals for size variations occurring with quantity production but also a finely finished appearance.

4 Claims, 3 Drawing Sheets

END SEALS FOR V-TYPE INTERNAL COMBUSTION ENGINES AND ENGINE SEALING METHOD

This invention relates to fluid seals, and more particularly, to new and improved end oil seals for V-type internal combustion engines and to a new and improved method for sealing engine components to prevent oil leaks.

Prior to the present invention, various sealing arrangements have been devised to effect the fluid sealing of major engine components such as the block, heads and manifold, so that oil leakage from the engine will be minimized or eliminated. Examples of such sealing systems are disclosed in U.S. Pat. No. 4,630,835, issued Dec. 23, 1986 to R. F. Locacius for "HEAD GASKET AND SEALING ASSEMBLY FOR A V-ENGINE AT THE INTERSECTION OF A BLOCK, A HEAD AND AN INTAKE MANIFOLD COVER", and U.S. Pat. No. 4,846,482 issued Jul. 11, 1989 to M. S. Blodget et al for "HIGH COMPLIANCE SEAL AND ENGINE COMBINATION."

The present invention is of the general category of the sealing arrangement of the above identified patents, but provides new and improved seals and method, which assures high quality, repetitive sealing of major engine components that meets higher standards for engine oil sealing in quality production.

The present invention is drawn to a new and improved end seal for engines, which is made from a closed cell foamed elastomeric material resistant to heat and oils that cooperates with the head and intake manifold gaskets regardless of "stack up" or size variations occurring with quantity production to provide for improved engine oil sealing.

In a preferred embodiment of the present invention, the closed celled foamed elastomer end seal is highly compressed during engine assembly when the manifold is assembled onto the block and the heads. The outboard ends of the end seal are elongated and tapered to initially lie against the head gaskets and to subsequently provide a covered cavity for the viscous sealant material during assembly. Importantly, the end seal is provided with an adhesive surface so that it will adhere to and be retained in its position as the manifold is assembled to the preassembled cylinder heads and block. This invention accordingly features transverse pockets, formed in the outboard ends of the end seal and fixed by the adhesive into which a quantity of the sealant material, such as a silicon based room temperature vulcanizing sealant (RTV), is installed prior to the installation of the manifold. As the manifold is installed onto the block and head, the end seal or seals are compressed by the manifold, and particularly, when the manifold is bolted onto the cylinder heads. This action squeezes the RTV into the void normally formed at the juncture of the associated gaskets and end seals of the block, head and manifold to effectively fill this void to an extent that the end seals and gaskets are sealingly connected and the engine assembly is sealed so that oil cannot leak therefrom.

This seal construction and method are particularly suitable for quantity production of engines in which there is a wide tolerance range of engine components.

An object, feature and advantage of this invention is to provide a new and improved end seal and method, particularly useful in sealing the end joints between the intake manifold and the cylinder block and heads of a V type internal combustion engine. The seal can be cut, or otherwise made, from a sheet of foamed material such as epichlorohydrin, silicone rubber, or other suitable sealing material with closed cells, and which is highly compressible so that it can seal components having a wide range of clearances to be sealed while using a minimum of force to compress the seal.

Another feature, object and advantage of this invention is to provide a new and improved engine end seal and sealing method in which the seal has a pressure sensitive adhesive layer on one side to maintain the seal in a fixed position on one of the components being sealed, and to particularly maintain a quality of room temperature vulcanized material, such as silicone rubber, in pockets at the ends of the seal so that it is maintained in a predetermined location as the manifold is brought down on to cylinder heads and block. As this installation continues, the end seals are compressed and the silicone rubber sealant is squeezed by the compression loads of the manifold into the joint between the cylinder heads, the block and the intake manifold so that this joint is fully sealed against oil leakage and against entrance of foreign matter into the engine.

These and other features, objects and advantages of this invention will become more apparent from the following detailed description and drawing in which:

DETAILED DESCRIPTION OF THE DRAWINGS

Figure 1:
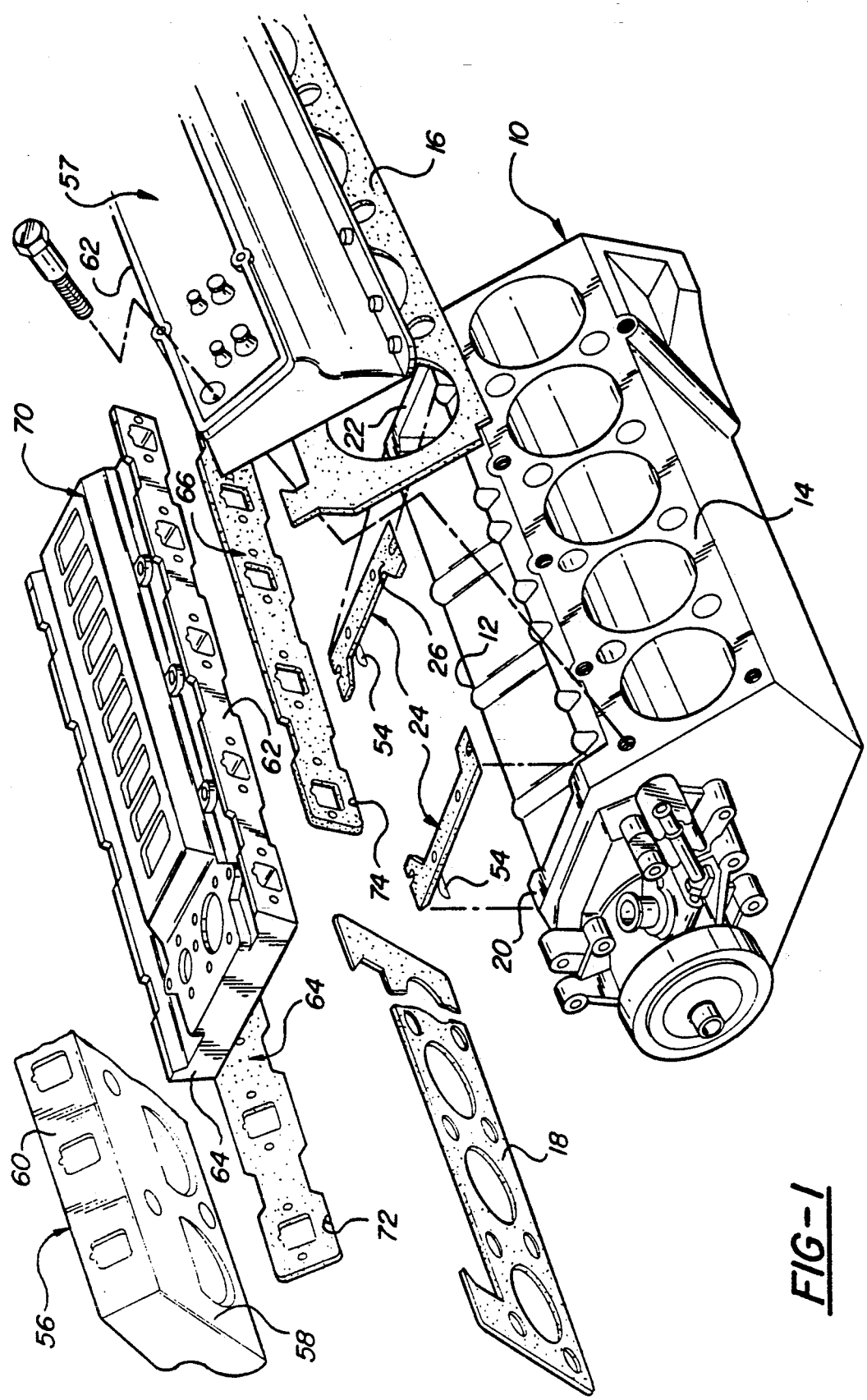
FIG. 1 is an exploded pictorial view of major portions of an internal combustion engine in addition to the end seals and the block and head gaskets prior to their assembly.

Turning in greater detail to the drawing as pictorially shown in the exploded view of FIG. 1, an engine block 10 having angularly inclined and flat and finished side surfaces 12 and 14 for receiving cylinder head gaskets 16 and 18 thereon. These head gaskets are relatively thin seals that may be made from steel with an aluminum coating, or other suitable materials, to withstand the high temperatures and pressures generated by an internal combustion engine during operation.

The engine block 10 has flattened upper surfaces 20 and 22 for receiving front and rear end seals 24, which are the same in construction. Each seal is cut, or otherwise made, from a closed cell foamed sheet of epichlorohydrin, silicone rubber or other suitable material, which does not degrade from the high temperature environment of internal combustion engines, from engine lubricants, or from contaminants from the exterior of the engine. Preferably, the seals in their free state have a thickness of 0.250 inches so as to accommodate the "limit stack" of mass produced gaskets and engine components.

Figure 4:
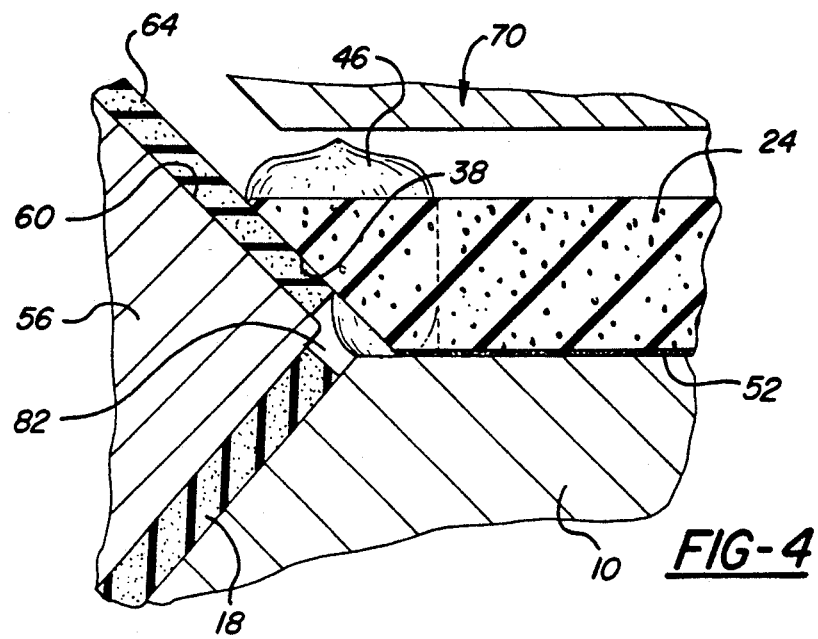
FIG. 4 is a sectional view taken generally along lines 4—4 of FIG. 3.
Figure 3:
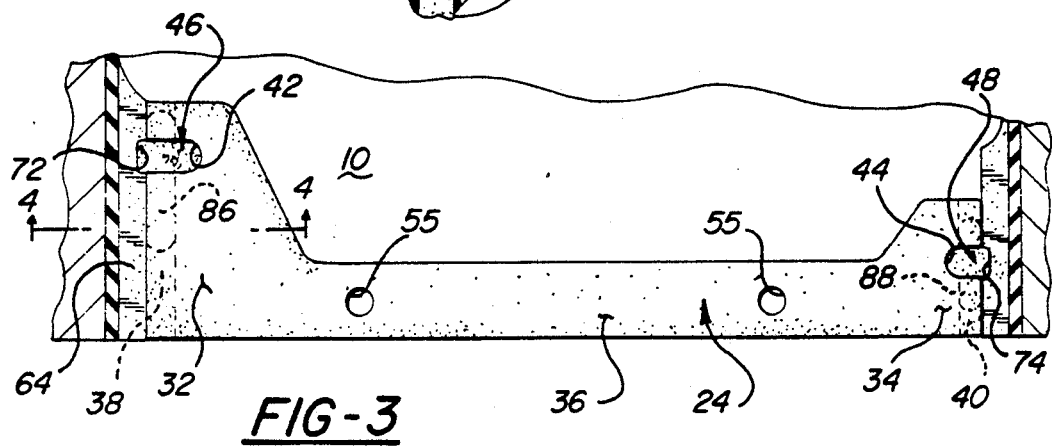
FIG. 3 is a top view taken generally along lines 3—3 of FIG. 2 showing this invention.

The seals 24 have an enlarged heads 32, 34 at opposite ends thereof interconnected by an elongated body 36 of relatively narrow width. The opposite terminal edges 38 and 40 of the head ends of the seals are beveled with a forty-five degree angular cut, as shown in FIGS. 3 and 4, and each has a vertically extending notch 42, 44 generally U-shaped in top view, which, when installed on the upper surfaces 20, 22 of the block 10, forms a pocket for a predetermined quantity of sealant 46, 48 such as silicone based sealant having high viscosity deposited therein.

The lower surface of each end seal 24 is coated with a layer of adhesive 52 that is shipped with a peel-away protective strip 54 of treated paper impervious to the adhesive 52 for easy removal and installation of the end seal by the installer.

The laterally spaced holes 55 in the main body of the seals are aligning holes to locate the seal to the block with an installation fixture not shown.

Figure 2:
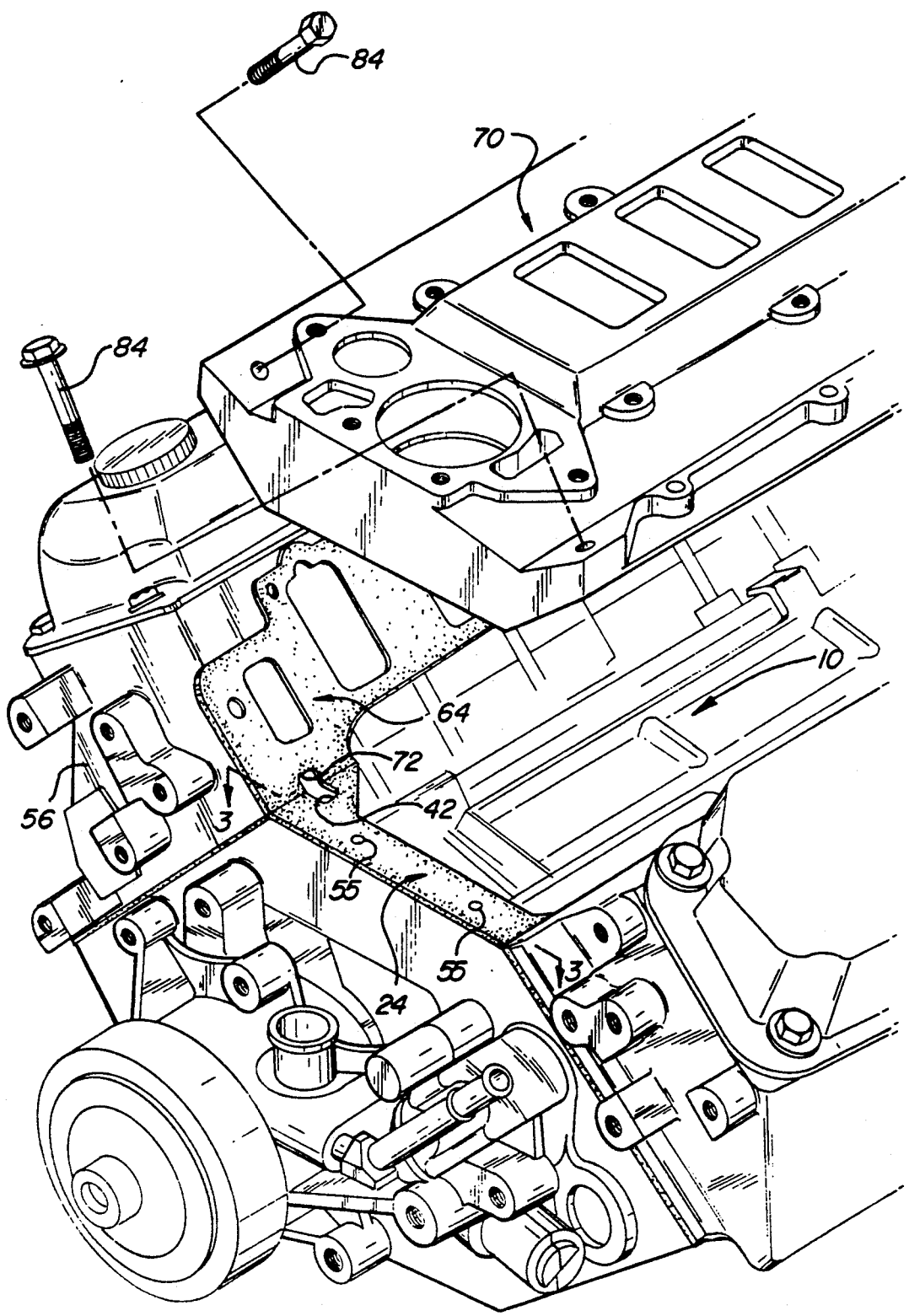
FIG. 2 is a pictorial view of a portion of the internal combustion engine of FIG. 1, but further showing the manifold being assembled to the block and cylinder heads with the intake manifold and cylinder head gaskets and the end seal being in place.

In addition to the block 10, head gaskets 16, 18 and the end seals 24, the engine has cylinder heads 56, 57 which have finished lower surfaces such as 58. When the cylinder heads are bolted onto the engine block 10, the head gaskets 16 and 18 are compressively loaded therebetween. The cylinder heads 56 have finished side surfaces 60 and 62 onto which the intake manifold gaskets 64 and 66 are fitted. These gaskets may be made from the same material as the head gaskets so they provide the high quality sealing and service life between the cylinder heads and the finished side surfaces 60 and 62 of the intake manifold 70. The intake manifold gaskets 64, 66 are notched, such as at 72 and 74, so that in the installed position, shown in FIG. 2, they are respectively aligned with the notches 42, 44 of the end seal.

After the cylinder heads are secured to the block such as by bolts 80, the notches 42, 44 are supplied with a predetermined quantity of semi-liquid silicone sealant 46, 48. This sealant fills the pockets formed by the cooperating notches in the end seals and the associated head gasket and may flow into the cavity, or recess 82, formed between the head and manifold gaskets and the end seal 24, as shown in FIG. 4. After being inserted into the pockets, the manifold 70 is lowered from the FIG. 2 or FIG. 4 position into an installed position of FIG. 5 where the silicone cures.

As the intake manifold is being bolted onto the cylinder heads, the end seals will be compressed to about one-half of their original height and until their thickness substantially equals the thickness of the intake manifold and cylinder head gaskets.

Figure 5:
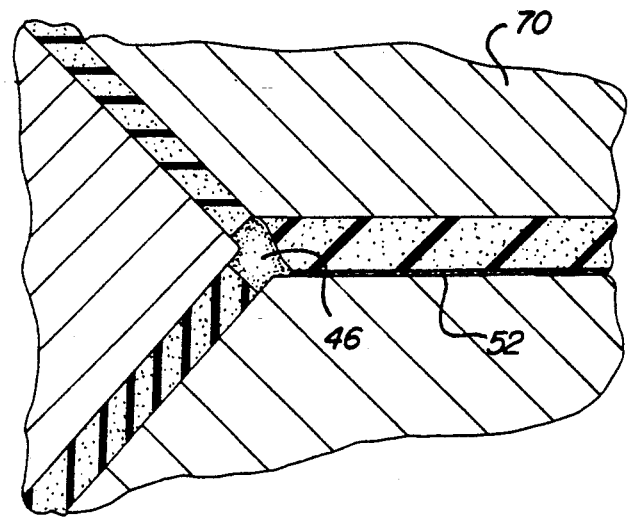
FIG. 5 is a sectional view similar to FIG. 4 but illustrating the components in a fully assembled position.

As shown in FIG. 5, the end seals 24 are compressively loaded by this action to about one-half of their original thickness. The quantity of silicone RTV 46 will be squeezed into the void areas 82 between the intake manifold and head gaskets and the end seal to seal the major engine components so that they will not leak oil during operation. The manifold is secured by bolts such as 84 to complete the assembly and insure that the sealant is forced into the recess 82.

Since the RTV runs laterally under cover of the wide end of the end seals as indicated by the dashed outline 86, 88, there is little or no likelihood of human operators or assembly equipment coming into contact with the sealant so that cleaning of sealant material from operators of their equipment is not necessary. Additionally, the material inserted into the pocket can be visually measured by the "candy drop" formation and does not possess sufficient volume to run outside of the cover provided by the enlarged ends of the end seal. Accordingly with this invention, a neat and finely finished appearance is provided aesthetically adding to the acceptability of the engine.

While a preferred embodiment of the invention has been shown and described, other embodiments will now become apparent to those skilled in the art. Accordingly, this invention is not to be limited to that which is shown and described but by the following claims.

What is claimed is:

1. A seal for the fluid sealing of separable components of an internal combustion engine to block fluid leakage from the engine comprising a flattened seal member of closed celled elastomeric material, compressible under load, said seal member being defined by an elongated body extending between enlarged head end portions, each of said enlarged head portions having terminal edges and recess means formed in the terminal edges of said head portion for receiving a quantity of liquified sealant material so that said sealant material will be forced along the terminal edges of said seal member and into a confined location when said engine components are secured together.

2. A seal for the fluid sealing of separable components of an internal combustion engine to block fluid leakage from the engine formed from compressible closed celled elastomeric material, said seal being defined by an elongated body extending between enlarged head end portions, said seal having a predetermined thickness throughout the extent thereof when in a natural state, a layer of adhesive extending along the bottom surface of said body and said end portions for affixing said seal to the surface of one of said separable components of said engine, said enlarged head having terminal edges initially inclined at an obtuse angle with respect to the flattened bottom surface of said seal, and recess means formed in the terminal edges of said seal for receiving and containing a quality of sealant material so that said material will be forced into a sealing position when said engine components are secured together and said seal is compressed thereby.

3. A method of sealing the block, manifold and head components of an internal combustion engine comprising the steps of:
   a. installing a head gasket between the cylinder block and a cylinder head of the engine,
   b. installing an intake manifold gasket on the intake manifold so that a lower edge portion thereof lies in a position adjacent to an upper edge of said head gasket,
   c. installing and securing a compressible end seal on said cylinder block so that said end seal lies against said intake manifold gasket and so that a discrete opening is formed at lower extremities of the head and intake manifold gaskets and the end seal,
   d. inserting a quantity of viscous sealing material in a pocket formed in said end seal that opens into said discrete opening,
   e. positioning an intake manifold on said cylinder head and said cylinder block to thereby compress said end seal and to effect the squeezing of said viscous sealing material into said discrete opening so that said gaskets and said end seal are sealingly interconnected and so that said discrete opening becomes blocked with said sealing material to thereby prevent leakage of fluids from said engine.

4. A method of sealing the block, manifold and head components of an internal combustion engine comprising the steps of:
   a. installing a head gasket between the cylinder block and a cylinder head of the engine,
   b. installing an intake manifold gasket on the intake manifold so that a lower edge portion thereof lies in a position adjacent to an upper edge of said head gasket,
   c. fastening a compressible end seal of closed foam material on said cylinder block so that said end seal lies against said intake manifold gasket and so that a discrete opening is formed at lower extremities of the head and intake manifold gaskets and the end seal,
   d. inserting a quantity of viscous sealing material in a pocket formed in said end seal that opens into said discrete opening,
   e. positioning an intake manifold on said cylinder head and said cylinder block to thereby compress said end seal to a predetermined height and to effect the squeezing of said viscous sealing material into said discrete opening so that said gaskets and said end seal are sealingly interconnected with one another and so that said discrete opening becomes blocked with said sealing material to thereby prevent leakage of oil from said engine.

* * * * *